United States Patent [19]
Kuster

[11] Patent Number: 4,561,046
[45] Date of Patent: Dec. 24, 1985

[54] SINGLE TRANSISTOR FORWARD CONVERTER WITH LOSSLESS MAGNETIC CORE RESET AND SNUBBER NETWORK

[75] Inventor: Karl H. Kuster, Glendale Heights, Ill.

[73] Assignee: GTE Automatic Electric Incorporated, Northlake, Ill.

[21] Appl. No.: 564,261

[22] Filed: Dec. 22, 1983

[51] Int. Cl.⁴ .......................................... H02P 13/22
[52] U.S. Cl. ....................................... 363/21; 363/56
[58] Field of Search ...................... 363/20, 21, 56, 131

[56] References Cited

U.S. PATENT DOCUMENTS 4,253,136  2/1981  Nanko ................................... 363/21
4,365,171  12/1982  Archer ................................. 363/20

FOREIGN PATENT DOCUMENTS 41769   4/1981  Japan ..................................... 363/20
22380   2/1982  Japan ..................................... 363/21
886187  11/1981  U.S.S.R. ............................... 363/131

Primary Examiner—William H. Beha, Jr.
Attorney, Agent, or Firm—Gregory G. Hendricks; Robert J. Black

[57] ABSTRACT

A switching isolated single transistor forward converter which performs demagnetization and snubbing functions with the same network. The transformer stored energy and the energy stored during snubbing are transferred to the load by the network during the dead time of the switching cycle.

8 Claims, 9 Drawing Figures

1

SINGLE TRANSISTOR FORWARD CONVERTER WITH LOSSLESS MAGNETIC CORE RESET AND SNUBBER NETWORK

FIELD OF THE INVENTION

The present invention relates to forward converter power supplies and more particularly to a switching isolated single transistor forward converter.

BACKGROUND OF THE INVENTION

Isolated single transistor forward converters include apparatus for demagnetizing the isolation transformer during each cycle of operation. This demagnetization requirement is unique to this type of converter. Protection networks, or snubbers, are also required to keep the converter's switching transistor within its safe operating area.

Various demagnetizing arrangements have been utilized by others. One approach is referred to as a lossless demagnetizing circuit since the stored energy of the transformer is returned to the power source during each switching cycle. Although the stored energy is not wasted in heat loss with the arrangement, the transistor is required to switch the sum of the output power and the displaced power during each switching cycle. Another approach is to convert the stored energy of the transformer to heat energy by means of a zener diode connected across the primary winding. A third approach is to direct the stored energy of the transformer to an auxiliary output. This auxiliary output performs the demagnetizing function since it is connected to a load.

Similarly, various snubber networks have also been utilized. With the lossless snubber network, the stored energy of a snubber capacitor is returned to the power source during each cycle, but the switching transistor is again required to switch the sum of the output power and the displaced power during each cycle. Another approach is to convert the stored energy of the snubber capacitor to heat energy.

SUMMARY OF THE INVENTION

In accordance with the present invention, a switching isolated forward converter is provided for use in a power system which includes a load and a source of input voltage having first and second terminals. The converter comprises switching means connected to the first input voltage source terminal, a transformer having primary and secondary windings, the primary winding being connected to the second input voltage source terminal and to the switching means. The converter also includes a protection circuit connected across the primary winding and a secondary circuit connected between the secondary winding and the load.

The switching means is operative to electrically connect the primary winding across the input voltage source, whereby primary current of a first characteristic flows through the primary winding. The primary winding is operative in response to the primary current of a first characteristic to provide magnetic flux of a first characteristic. The protection circuit is operative in response to the magnetic flux of a first characteristic to store primary energy of first characteristic.

The secondary winding is operative in response to the magnetic flux of a first characteristic to provide secondary voltage of a first characteristic. The secondary circuit is operative in response to the secondary voltage of a first characteristic to provide output current of a first characteristic.

The switching means is further operative to electrically disconnect the primary winding from the input voltage source and the primary winding is operative in response to the disconnection to provide primary current of a second characteristic. The primary winding is operative in response to the primary current of a second characteristic to provide magnetic flux of a second characteristic. The protection circuit is operative in response to the magnetic flux of a second characteristic and the stored primary energy of a first characteristic to store primary energy of a second characteristic. The secondary winding is operative in response to the magnetic flux of a second characteristic to provide secondary voltage of a second characteristic. The secondary circuit is operative in response to the secondary voltage of a second characteristic to provide output current of a second characteristic.

The protection circuit is further operative to release the stored primary energy of a second characteristic, whereby primary current of a third characteristic flows through said primary winding. The primary winding is operative in response to the primary current of a third characteristic to provide magnetic flux of a third characteristic. The secondary winding is operative in response to the magnetic flux of a third characteristic to provide secondary voltage of a third characteristic, and the secondary circuit is operative in response to the secondary voltage of a third characteristic to provide output current of a third characteristic.

DESCRIPTION OF THE PREFERRED EMBODIMENT

The switching isolated single transistor forward converter of the present invention discloses a novel arrangement for providing the required demagnetization and snubbing functions required by this type of converter. With this arrangement the stored energy of the transformer is transferred to the output. Therefore the switching transistor is only required to switch the output power and not the sum of the output and displaced, or dissipated, power. This arrangement also provides for nondissipative snubbing, since the snubbing energy is also transferred to the output.

Figure 1:
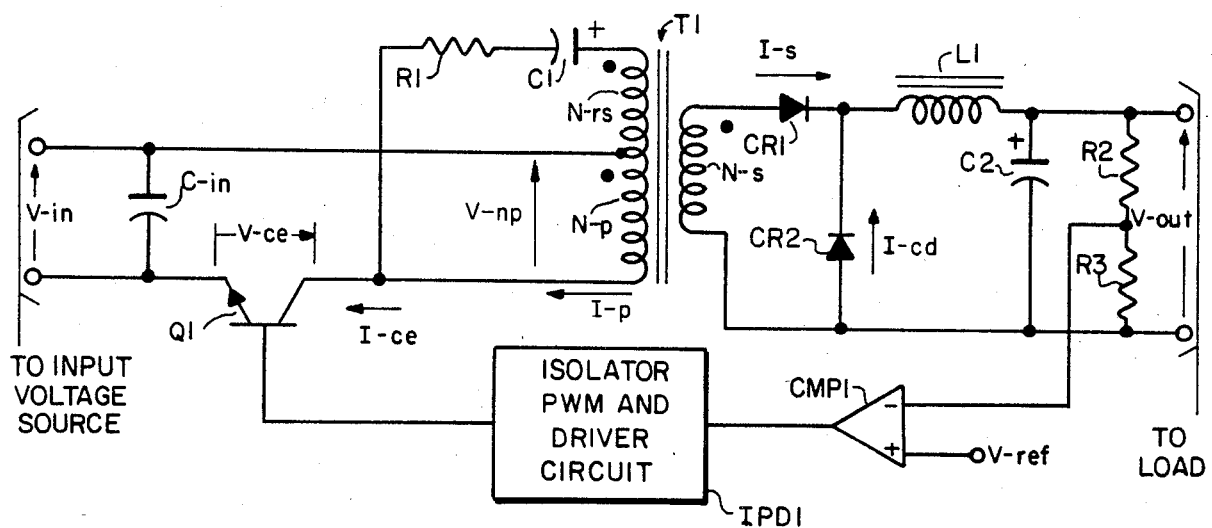
FIG. 1 is a combined schematic and block diagram of the switching isolated single transistor forward converter of the present invention.

Referring now to FIG. 1, the switching isolated single transistor forward converter of the present invention is shown. Capacitor C-in is connectable to the input voltage source. This capacitor is connected to the junction of primary winding N-p and reset winding N-rs of transformer T1. The series combination of these windings is connected in parallel with the series combination of resistor R1 and capacitor C1. The junction of resistor R1 and primary winding N-p is connected to the collector of transistor Q1, while the emitter of this transistor is connected to capacitor C-in. Isolator, pulse width modulator (PWM) and driver circuit IPD1 is connected between comparator CMP1 and the base of transistor Q1. The anodes of diodes CR1 and CR2 are connected to opposite ends of secondary winding N-s while the cathodes of these diodes are connected to each other and to inductor L1. This inductor is further connected to the junction of resistor R2 and capacitor C2. Resistor R2 is further connected to resistor R3 and the negative input of comparator CMP1. The positive input of this comparator is connected to reference voltage source V-ref. Resistor R3 and capacitor C2 are connected to the anode of diode CR1 while the series combination of resistors R2 and R3 is connectable to the load.

Switching isolated single transistor forward converters have three distinct periods of time during each switching cycle. These time intervals are commonly referred to as the on time (T-on), reset time (T-rs) and dead time (T-d). The dead time is a wasted time interval for the prior art forward converters because those converters do not transfer power through the transformer to the load during the dead time.

The forward converter of the present invention, however, utilizes the dead time interval to discharge the stored energy of the demagnetizing and snubbing network into the load. This arrangement requires transistor Q1 to conduct only the reflected load current and not the magnetizing and snubbing currents because the magnetizing and snubbing currents are discharged into the load during the dead time of each switching cycle. Also, reset winding N-rs need not have the same number of turns as primary winding N-p. The prior art forward converters have such a restriction and thus are less able to optimize utilization of switching transistors.

When the forward converter of the present invention is connected between the input voltage source V-in and the load, it operates to apply power to the load. To control this power, comparator CMP1 and isolator, pulse width modulator and driver circuit IPD1 controls transistor Q1. The structure and operation of the CMP1 and IPD1 circuits is old and well known. However a novel arrangement of such circuits was disclosed in U.S. Pat. No. 4,322,817 which issued on Mar. 30, 1982 to Karl H. Kuster.

When transistor Q1 is turned on, the input voltage V-in is applied across primary winding N-p. The resultant voltage across primary winding N-p is magnetically coupled to reset winding N-rs. Consequently a voltage equal to (V-in) (1+(N-rs)/(N-p)) is applied to capacitor C1. If the primary and reset windings have an equal number of turns, then the voltage applied to capacitor C1 equals 2(V-in).

R-C networks charge up to approximately their full charging voltage in five R-C time constants. Consequently capacitor C1 charges up to the voltage equal to (V-in) (1+(N-rs)/(N-p)) in five R1-C1 time constants. These five time constants are of a duration less than the on time of transistor Q1, and no current flows in reset winding N-rs during the on time, after capacitor C1 is charged up.

When the base drive current of transistor Q1 is removed by isolator, pulse width modulator and drive circuit IPD1, primary winding N-p and reset winding N-rs tend to reverse their polarity in order to maintain current flow. However, capacitor C1 causes the current through these windings to decay slowly, thereby causing a delay in the reverse voltage build-up of windings N-p and N-rs.

Figure 2:
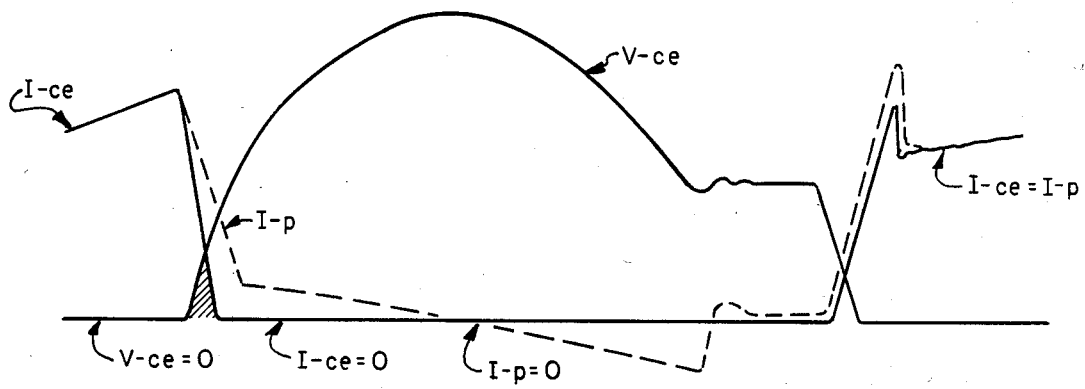
FIGS. 2 and 3 are waveform diagrams of various signals identified in FIG. 1.

Thus capacitor C1 and winding N-rs delay the rise of collector-emitter voltage V-ce of transistor Q1 until collector-emitter current I-ce has started to fall. This snubbing action greatly reduces the losses in transistor Q1. The losses that are generated, are represented by the shaded area under the expanded I-ce and V-ce waveforms shown in FIG. 2. As this area is made smaller, losses decrease, since there is less coincidence of current and voltage. Resistor R1 dampens possible ringing frequencies generated by the fall and rise of collector-emitter voltage V-ce and the parasitic capacitance of transformer T1.

The instant collector-emitter current I-ce starts falling, primary winding N-p starts to reverse its voltage polarities and then capacitor C1 and inductance Lr, of primary winding N-p and reset winding N-rs, start to resonate. The frequency of resonance F-r can be expressed as follows:

$$F\text{-}r = \tfrac{1}{2}\pi \sqrt{C1(Lr)} \tag{1}$$

The collapse of the current through primary winding N-p causes it to reverse its polarity in order to keep current flowing in the same direction. The voltage across reset winding N-rs also reverses and current starts to flow out of the positive side of capacitor C1, through windings N-rs and N-p, and back into the negative side of capacitor C1. This tank circuit can resonate unmolested for one-half cycle. The resonant frequency can be expressed in terms of the reset time T-rs of transformer T1 as follows:

$$F\text{-}r = \tfrac{1}{2}T\text{-}rs \tag{2}$$

When equation 1 is substituted into equation 2, the equation for reset time T-rs is defined as follows:

$$T\text{-}rs = \pi \sqrt{C1(Lr)} \tag{3}$$

Figure 3:
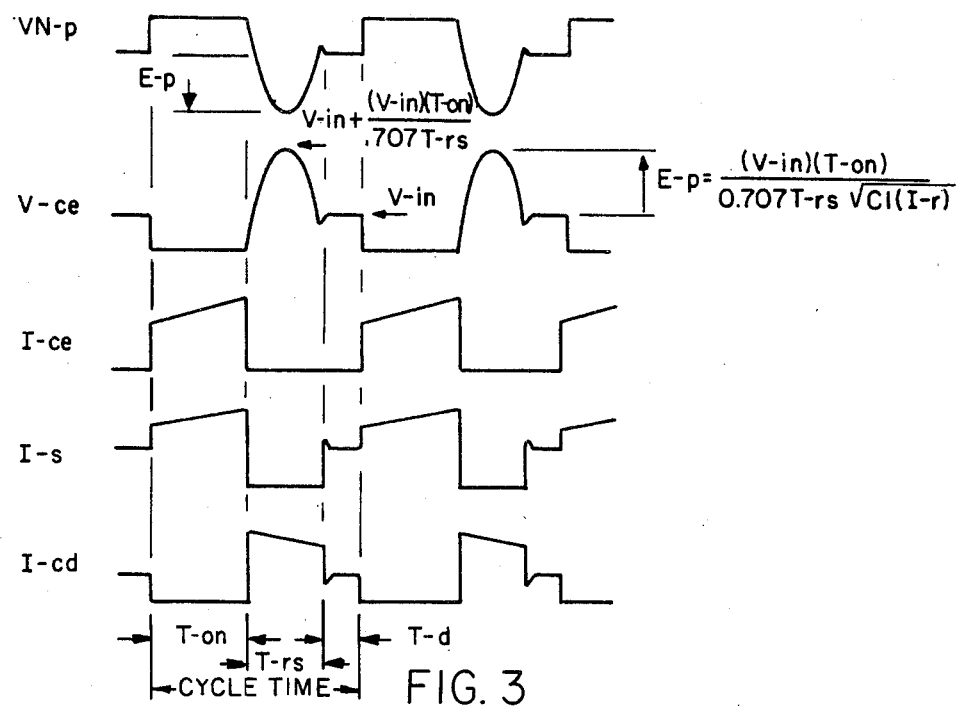

Referring now to FIG. 3, waveforms for collector-emitter voltage V-ce collector-emitter current I-ce, secondary current I-s and catch diode current I-cd are shown, as related to T-on, T-rs and T-d. The average voltage across primary winding N-p must equal zero. Therefore the average voltage multiplied by T-on must equal the average applied voltage multipled by T-rs. The peak value E-p of the half sine wave superimposed across the primary winding during reset time T-rs is shown in waveform UN-p. The root mean square (RMS) value of the area under this sine wave is 0.707(E-p). Therefore the relationship of the on time and reset time voltages can be expressed as follows:

$$(V\text{-}in)(T\text{-}on) = 0.707(E\text{-}p)(T\text{-}rs) \tag{4}$$

so $$E\text{-}p = ((V\text{-}in)(T\text{-}on))/((0.707)(T\text{-}rs)) \tag{5}$$

Primary winding N-p and reset winding N-rs then try to reverse polarity after the tank circuit has gone through 180° of commutation (end of T-rs). However voltage does not build up across secondary winding N-s because catch diode CR2 clamps its voltage to a maximum of one diode voltage drop. Secondary winding N-s then operates like a current generator and causes current to flow through secondary diode CR1, inductor L1 and voltage divider R2-R3.

The waveform for catch diode current I-cd is also shown in FIG. 3. During reset time T-rs, catch diode current I-cd is maintained by inductor L1. However, during dead time T-d, secondary current I-s begins to flow, as shown in the I-s waveform. Since inductor L1 attempts to maintain constant current through its windings, catch diode current I-cd is reduced by an amount equal to the secondary current. Thus current flows through secondary diode CR1 during both the on time T-on and the dead time T-d.

During on time T-on, transistor Q1 again turns on, and causes a high collector-emitter current I-ce to flow. This high I-ce current causes a high positive voltage to be magnetically coupled to secondary winding N-s. This causes a high secondary current I-s to flow, and it also causes a high positive voltage to appear at the cathode of catch diode CR2. This diode is then reverse biased, so it turns off and catch diode current I-cd stops flowing.

Figure 4:
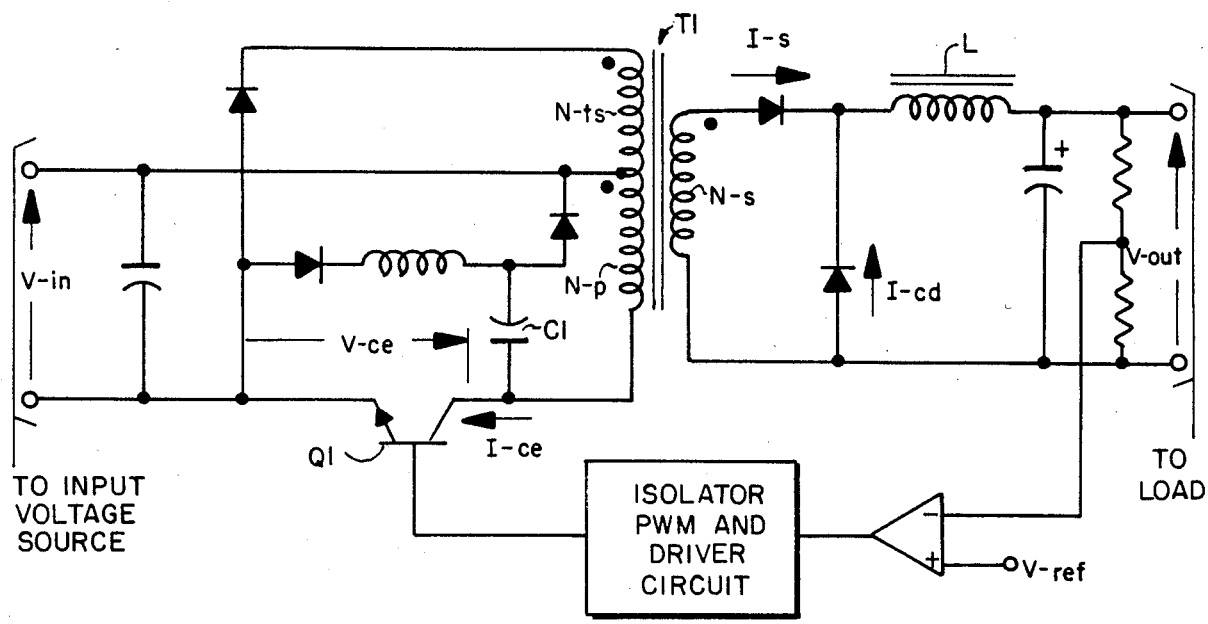
FIGS. 4, 6 and 8 are combined schematic and block diagrams of prior art forward converters.

Referring now to FIG. 4, a prior art converter is shown which returns the energy stored in transformer T1 and snubber capacitor C1 to the power source during each switching cycle. This arrangement is referred to as a lossless demagnetizing circuit since the stored energy is not wasted in heat losses. However, with such an arrangement transistor Q1 is required to switch the sum of the output power and displaced power during each switching cycle.

Figure 6:
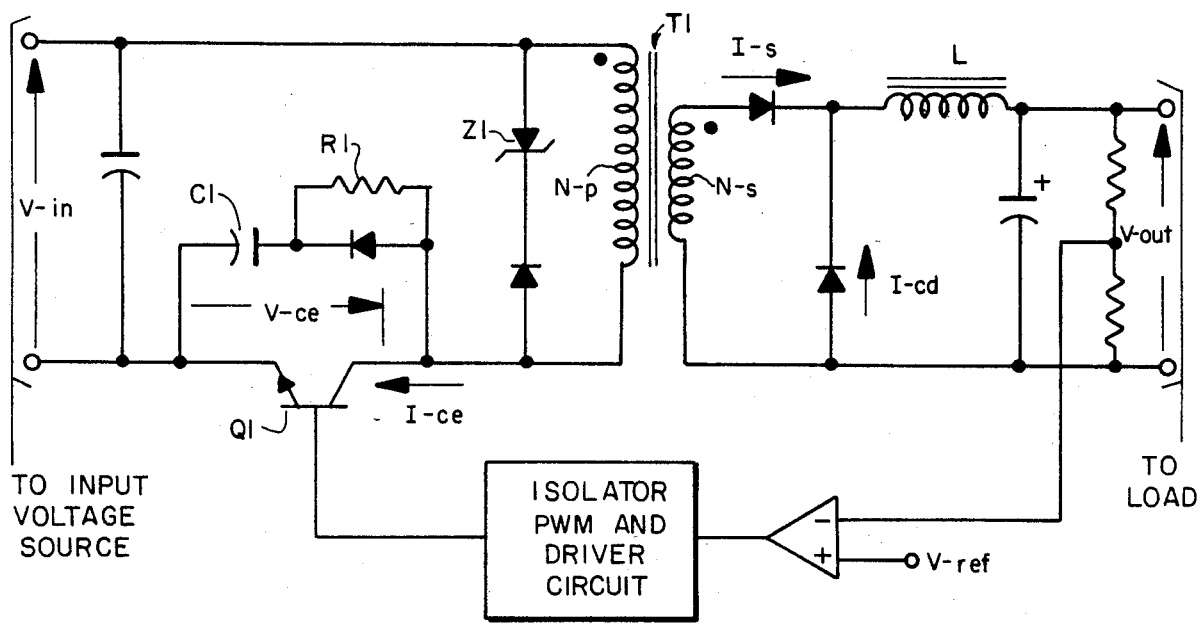

Referring now to FIG. 6, a prior art converter is shown which includes zener diode Z1 connected across the primary winding N-p of transformer T1. With this arrangement, the energy stored in transformer T1 and snubber capacitor C1 is converted into heat energy by zener diode Z1 and resistor R1.

Figure 8:
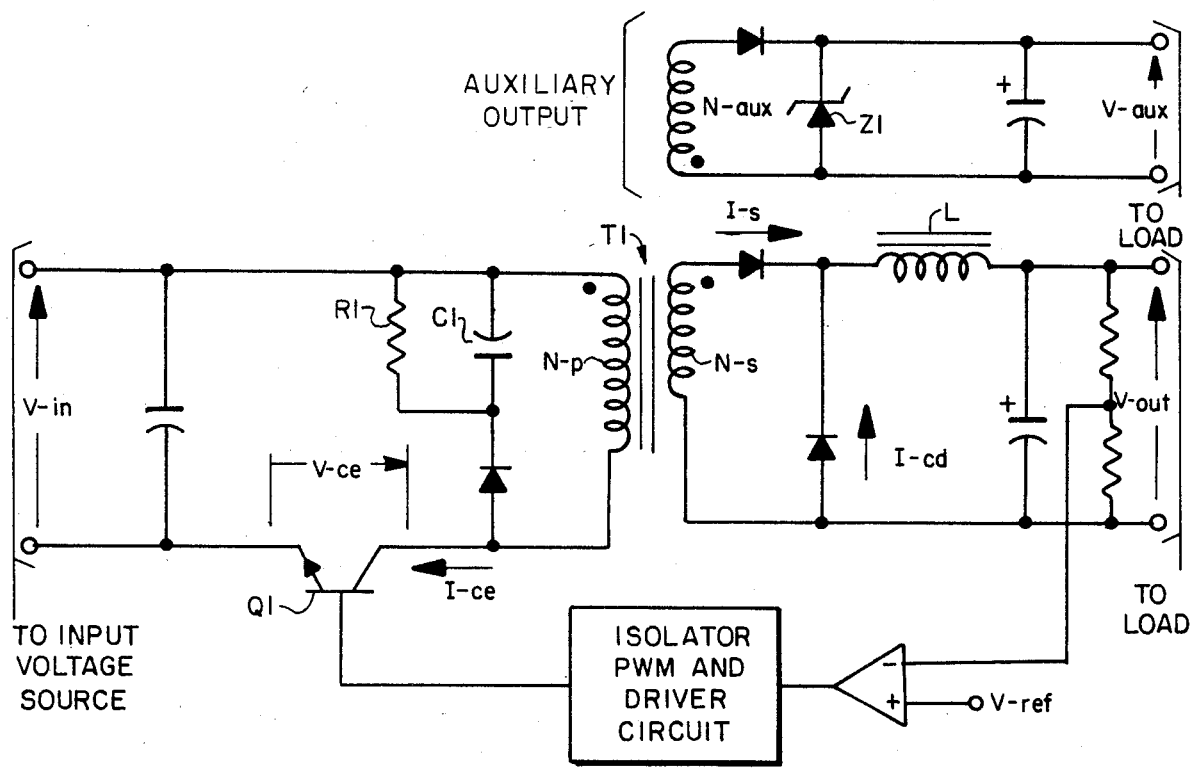

Referring now to FIG. 8, a prior art converter is shown which utilizes an auxiliary output to perform the demagnetization function. This auxiliary output includes zener diode Z1 connected across auxiliary winding N-aux. The auxiliary output is lightly loaded at all times in order to perform the demagnetizing function. With this arrangement, the stored energy in transformer T1 and snubber capacitor C1 is converted into heat energy by zener diode Z1 and resistor R1.

Figure 5:
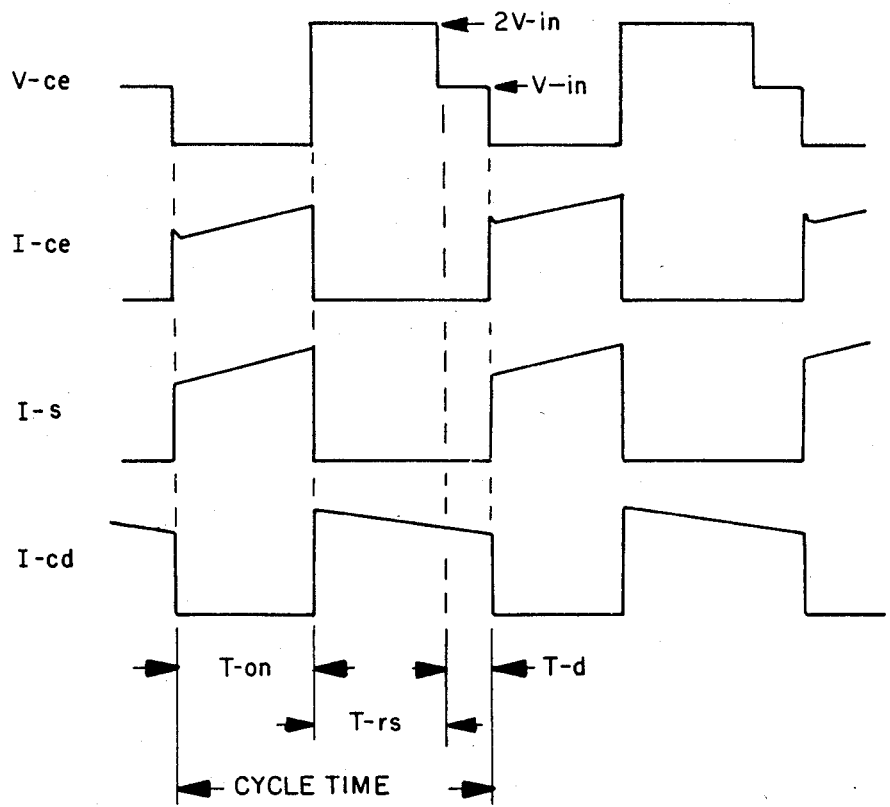
FIGS. 5, 7 and 9 are waveform diagrams of signals identified in FIGS. 4, 6 and 8, respectively.
Figure 7:
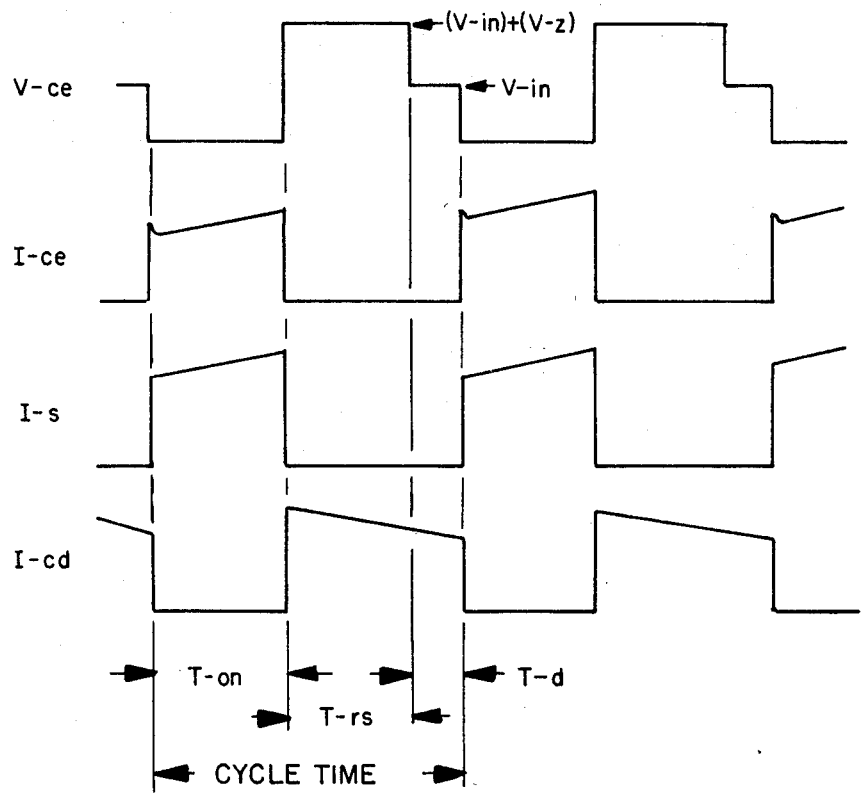
Figure 9:
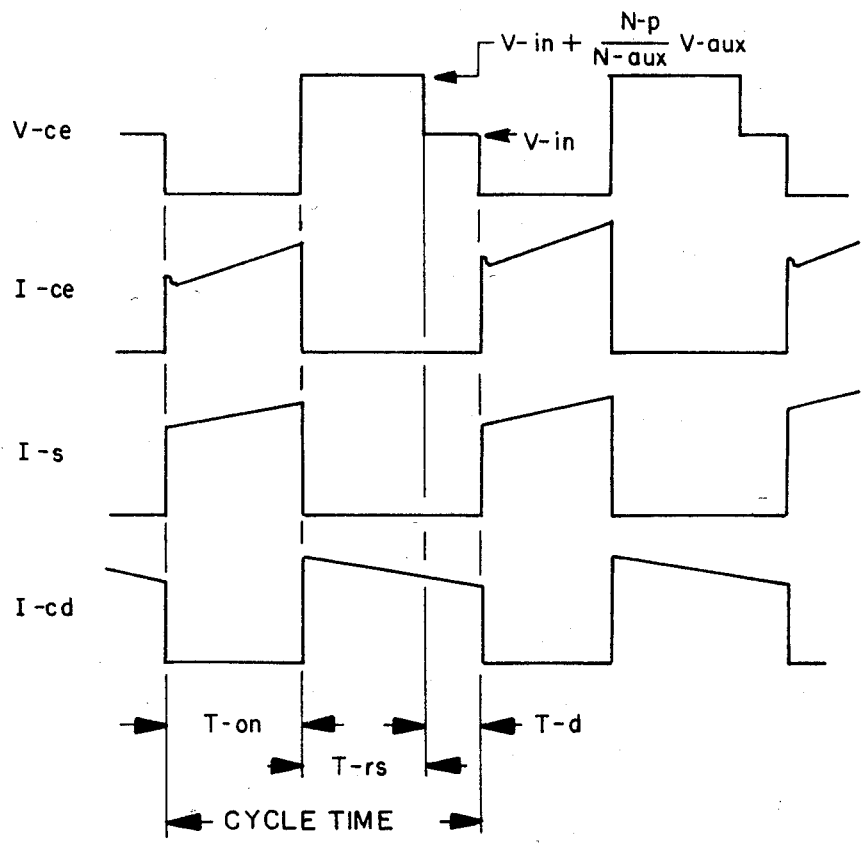

Referring now to prior art FIGS. 5, 7 and 9, the waveforms of selected signals identified in FIGS. 4, 6 and 8, respectively, are shown. In contrast to the present invention, waveforms for the secondary current I-s and catch diode current I-cd, in each of these figures, do not show any secondary I-s current flow during dead time T-d. Thus these prior art converters are not as efficient as the converter of the present invention which not only utilizes the same network to perform the demagnetization and snubbing functions, but it also transfers the energy stored in the transformer and snubber capacitor to the load during the dead time of each switching cycle. Also, in contrast to the prior art converters, the switching transistor of the present invention can be operated at its maximum collector-emitter voltage (V-ce) rating and the collector current can be optimized by adjusting the transformer turns ratio (N-p)/(N-s). These operating efficiencies are achieved because no collector-emitter current I-ce is present when the collector-emitter voltage V-ce is at its maximum.

It will be obvious to those skilled in the art that numerous modifications of the present invention can be made without departing from the spirit of the invention which shall be limited only by the scope of the claims appended hereto.

What is claimed is:

1. A switching isolated forward converter for use in a power system which includes a load and a source of input voltage having first and second terminals, said converter comprising:

switching means connected to said first input voltage source terminal;

a transformer having primary and secondary windings, said primary winding being connected to said second input voltage source terminal and to said switching means;

a protection circuit connected across said primary winding; and a secondary circuit connected between said secondary winding and said load;

said switching means being operative to electrically connect said primary winding across said input voltage source, whereby primary current of a first characteristic flows through said primary winding;

said primary winding being operative in response to said primary current of a first characteristic to provide magnetic flux of a first characteristic;

said protection circuit being operative in response to said magnetic flux of a first characteristic to store primary energy of first characteristic;

said secondary winding being operative in response to said magnetic flux of a first characteristic to provide secondary voltage of a first characteristic;

said secondary circuit being operative in response to said secondary voltage of a first characteristic to provide output current of a first characteristic;

said switching means being further operative to electrically disconnect said primary winding from said input voltage source;

said primary winding being operative in response to said disconnection to provide primary current of a second characteristic said primary winding being operative in response to said primary current of a second characteristic to provide magnetic flux of a second characteristic;

said protection circuit being operative in response to said magnetic flux of a second characteristic and said stored primary energy of a first characteristic to store primary energy of a second characteristic;

said secondary winding being operative in response to said magnetic flux of a second characteristic to provide secondary voltage of a second characteristic;

said secondary circuit being operative in response to said secondary voltage of a second characteristic to provide output current of a second characteristic;

said protection circuit being further operative to release said stored primary energy of a second characteristic, whereby primary current of a third characteristic flows through said primary winding;

said primary winding being operative in response to said primary current of a third characteristic to provide magnetic flux of a third characteristic;

said secondary winding being operative in response to said magnetic flux of a third characteristic to provide secondary voltage of a third characteristic; and said secondary circuit being operative in response to said secondary voltage of a third characteristic to provide output current of a third characteristic.

2. A switching isolated forward converter as claimed in claim 1, wherein the voltage across said switching means rises in response to said primary current of a second characteristic; said protection means being operative to delay said voltage rise while said primary current of a second characteristic approaches termination; whereby the magnetic of coincident voltage across, and primary current of a second characteristic through, said switching means is decreased.

3. A switching isolated forward converter as claimed in claim 2, wherein said protection circuit comprises a series combination of a reset winding, a storage capacitor and a resistor, all connected in parallel with said primary winding, and said reset winding being magnetically coupled to said primary winding.

4. A switching isolated forward converter as claimed in claim 1, wherein said secondary circuit includes storage means operative in response to said output current of a first characteristic to store secondary energy.

5. A switching isolated forward converter as claimed in claim 4, wherein said secondary circuit is further operative in response to said secondary voltage of second characteristic to release said stored secondary energy, whereby said secondary circuit provides said output current of a second characteristic.

6. A switching isolated forward converter as claimed in claim 1, wherein said secondary circuit is further operative to clamp said secondary voltage of a third characteristic to a predetermined value.

7. A switching isolated forward converter as claimed in claim 6, wherein said secondary circuit is further operative in response to said secondary voltage of a third characteristic and said released secondary energy to provide said output current of a third characteristic.

8. A switching isolated forward converter as claimed in claim 7, wherein said secondary circuit comprises a secondary diode connected to said secondary winding, a clamping diode connected across the series combination of said secondary winding and said secondary diode an inductor connected to the junction of said secondary and clamping diodes, said diodes being connected to each other with opposing polarities, and a connection to the junction of said clamping diode and said secondary winding;

said inductor being operative to provide said stored secondary energy;

said secondary diode being operative to pass said output current of a first characteristic;

said clamping diode being operative to pass said output current of a second characteristic; and said secondary and clamping diode each being operative to provide a portion of said output current of a third characteristic.

* * * * *